US010743183B2

(12) United States Patent
Su (10) Patent No.: US 10,743,183 B2
(45) Date of Patent: Aug. 11, 2020

(54) METHOD AND DEVICE FOR REALIZING WIRELESS ACCESS POINT CONNECTION AUTHENTICATION

(71) Applicant: SHANGHAI ZHANGXIAN NETWORK TECHNOLOGY CO., LTD., Shanghai (CN)

(72) Inventor: Yong Su, Shanghai (CN)

(73) Assignee: SHANGHAI ZHANGXIAN NETWORK TECHNOLOGY CO., LTD., Shanghai (CN)

(*) Notice: Subject to any disclaimer, the term of this patent is extended or adjusted under 35 U.S.C. 154(b) by 2 days.

(21) Appl. No.: 16/118,521

(22) Filed: Aug. 31, 2018

(65) Prior Publication Data

US 2018/0376335 A1 Dec. 27, 2018

Related U.S. Application Data

(63) Continuation of application No. PCT/CN2016/113619, filed on Dec. 30, 2016.

(30) Foreign Application Priority Data

Jul. 11, 2016 (CN) .......................... 2016 1 0542532

(51) Int. Cl.
*H04W 12/06* (2009.01)
*H04W 12/08* (2009.01)
(Continued)

(52) U.S. Cl.
CPC ........... *H04W 12/06* (2013.01); *H04W 12/08* (2013.01); *H04L 63/20* (2013.01);
(Continued)

(58) Field of Classification Search
CPC ..................................................... G06F 20/30
See application file for complete search history.

(56) References Cited

U.S. PATENT DOCUMENTS

2002/0037708 A1* 3/2002 McCann ............. H04L 63/0892
455/411
2005/0083846 A1* 4/2005 Bahl ..................... H04W 12/06
370/236
(Continued)

FOREIGN PATENT DOCUMENTS

CN 101677440 A 3/2010
CN 102209324 A 10/2011
(Continued)

*Primary Examiner* — Ponnoreay Pich
(74) *Attorney, Agent, or Firm* — Kilpatrick Townsend & Stockton, LLP (57) ABSTRACT

The application provides methods and devices for implementing wireless access point connection authentication. The method includes acquiring a connection authentication request of a user device generated during a connection with a target wireless access point; and executing an authentication module corresponding to the access point type information to complete the connection authentication of the target wireless access point on the basis of access point type information corresponding to the target wireless access point. Compared with the prior art, the method and device meet the diversified demand on the connection authentication when the users connect to the wireless access points in practice and meet the needs of connection authentication of various types of wireless access points. Meanwhile, the authentication module can implement automatic connection authentication and reduces the manual operation of the users, thereby meeting demand on facilitating connection authentication when the users connect to the wireless access points.

11 Claims, 4 Drawing Sheets

(51) Int. Cl.
*H04W 84/12* (2009.01)
*H04W 88/08* (2009.01)
*H04L 29/06* (2006.01)
*H04W 12/00* (2009.01)

(52) U.S. Cl.
CPC ...... *H04W 12/00516* (2019.01); *H04W 84/12* (2013.01); *H04W 88/08* (2013.01)

(56) References Cited

U.S. PATENT DOCUMENTS

| | | |
|---|---|---|
| 2014/0230022 A1 | 8/2014 | Yuasa et al. |
| 2015/0043561 A1* | 2/2015 | Xia ................. H04W 12/06 370/338 |
| 2015/0172923 A1 | 6/2015 | Osaki et al. |
| 2015/0365397 A1* | 12/2015 | Chang ............... H04L 63/083 726/4 |
| 2016/0119304 A1* | 4/2016 | Lelcuk ............... H04L 63/08 726/3 |
| 2018/0014188 A1* | 1/2018 | Liu .................. H04W 12/06 |
| 2018/0376335 A1* | 12/2018 | Su ................... H04W 12/06 |

FOREIGN PATENT DOCUMENTS

| | | |
|---|---|---|
| CN | 102572831 A | 7/2012 |
| CN | 104350802 A | 2/2015 |
| CN | 104378382 A | 2/2015 |
| CN | 105933905 A | 9/2016 |
| WO | 2016090578 A1 | 6/2016 |

\* cited by examiner

METHOD AND DEVICE FOR REALIZING WIRELESS ACCESS POINT CONNECTION AUTHENTICATION

CROSS-REFERENCES TO RELATED APPLICATIONS

This application is a continuation of International Application No. PCT/CN2016/113619, filed on Dec. 30, 2016, which claims priority to Chinese Patent Application No. CN, 201610542532.7, filed on Jul. 11, 2016. The disclosures of the aforementioned applications are hereby incorporated by reference in their entireties.

FIELD OF THE INVENTION

The present application relates to the field of computers, and in particular to a technique for implementing connection authentication of a wireless access point.

BACKGROUND OF THE INVENTION

In the prior art, when a user device is to access a wireless network, for example, when the user device is connected to enter a WiFi (wireless fidelity) network, generally, a search is first performed based on the user device for wireless access points around the device, and then a target wireless access point is selected to initiate a network access request. Some of the wireless access points need to perform corresponding connection authentications during a user connection process. Generally, a user receives an authentication page corresponding to the target wireless access point, enters a mobile phone number in the authentication page, and manually clicks to send a verification code, then based on the verification code received by the mobile phone number, manually inputs the verification codes and clicks for authentication, thereby performing the corresponding connection authentication. The connection authentication approach is relatively simple, and the authentication process is complicated, and the user is required to manually participate in the connection authentication process, so that it cannot meet diversified and convenient requirements of the connection authentication when the user connects to the wireless access point, and is detrimental to the improvement of user experience.

BRIEF SUMMARY OF THE INVENTION

An objective of the present application is to provide a method and device for implementing connection authentication of a wireless access point.

According to an aspect of the present application, a method for implementing connection authentication of a wireless access point is provided, comprising:

acquiring a connection authentication request of a user device during a connection with a target wireless access point; and executing, according to access point type information corresponding to the target wireless access point, an authentication module corresponding to the access point type information to complete the connection authentication of the target wireless access point.

According to another aspect of the present application, a user device for implementing connection authentication of a wireless access point is further provided, comprising:

first means for acquiring a connection authentication request of a user device during a connection with a target wireless access point; and second means for executing, according to access point type information corresponding to the target wireless access point, an authentication module corresponding to the access point type information to complete the connection authentication of the target wireless access point.

Compared with the prior art, for the acquired connection authentication request corresponding to the target wireless access point, the user device in the present application will correspondingly execute, on the basis of different types of access point type information, a specific authentication module corresponding to the access point type information, so as to complete the connection authentication of the target wireless access point. Thereby, diversified demands on the connection authentication when the user connects to the wireless access point can be met in practice and the needs of connection authentication of various types of wireless access points can be addressed. Meanwhile, the authentication module can implement automatic connection authentication, thereby reducing the manual operation of the users, and meeting convenient demand on connection authentication when the users connect to the wireless access point.

Further, when the access point type information indicates the cooperation authentication access point, the user device determines an authentication module corresponding to the matched access point type information based on protocol feature information contained in the received connection authentication request, and then can complete the connection authentication of the target wireless access point by executing the authentication module. Here, with the present application, the user device can be smoothly compatible with the connection authentication approaches under various custom protocols, and may provide a platform that can be used by specific users for various types of wireless access points based on custom authentication approaches, thereby enriching the wireless access points that users can authenticate and use. Moreover, the connection authentication process implemented based on the cooperation authentication access point in the present application is convenient and has a high degree of automation, which brings good networking experience to the users.

Further, when the access point type information indicates the short message authentication access point, the user device will execute an authentication module corresponding to the access point type information on the displayed authentication page to complete the connection authentication of the target wireless access point. In particular, in an embodiment, a series of operations, such as automatic sending of the verification information acquisition request corresponding to the connection authentication request, and automatic extraction and input of the corresponding verification information are implemented by executing the authentication module to complete the connection authentication of the target wireless access point. Thereby, replacing a user manual connection authentication operation by an automatic authentication operation of the authentication module improves the efficiency of the connection authentication of the wireless access point and optimizes the user experience.

BRIEF DESCRIPTION OF THE DRAWINGS

By reading the following detailed description made with reference to the drawings for non-limiting embodiments, the other features, objectives and advantages of the present application will become more apparent.

In the drawings, the same or similar reference signs represent the same or similar components.

DETAILED DESCRIPTION OF THE INVENTION

The present application is hereinafter further described in detail with reference to the accompanying drawings.

In a typical configuration of the present application, a terminal, a device of a service network and a trustable party all include one or more processors (CPUs), an input/output interface, a network interface and a memory.

The memory may include a non-permanent memory, a random access memory (RAM) and/or a non-volatile memory (such as a read-only memory (ROM) or a flash memory (flash RAM)) and so on in a computer-readable medium. The memory is an example of a computer-readable medium.

A computer-readable medium comprises permanent and non-permanent, movable and non-movable media and may realize information storage by means of any method or technology. The information may be a computer-readable instruction, a data structure, a program module or other data. The examples of a computer storage medium include but are not limited to a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and carrier.

Figure 1:
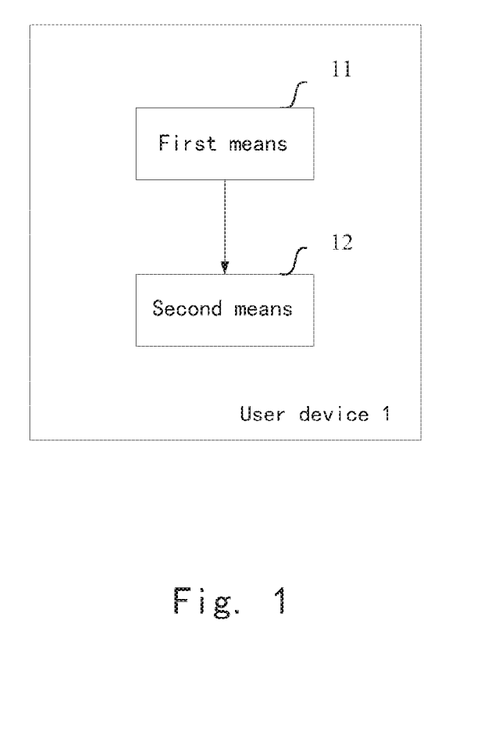
FIG. 1 shows a schematic device diagram of a user device for implementing connection authentication of a wireless access point according to one aspect of the present application.

FIG. 1 shows a schematic device diagram of a user device 1 for implementing connection authentication of a wireless access point according to one aspect of the present application. The user device 1 includes first means 11 and second means 12. The first means 11 acquires a connection authentication request of a user device 1 during a connection with a target wireless access point; and the second means 12 executes, according to access point type information corresponding to the target wireless access point, an authentication module corresponding to the access point type information to complete the connection authentication of the target wireless access point. Here, the user device 1 includes various smart terminals, such as a mobile smart device, various personal computers, and so forth.

Specifically, the first means 11 acquires a connection authentication request of a user device 1 during a connection with a target wireless access point. Here, the user device 1 may determine the target wireless access point requested to connect, based on the selection of the user, or the user device 1 automatically determines the target wireless connection point for the corresponding user based on pre-set connection conditions. Here, in order to improve success rate of wireless connection, the target wireless access point may be from wireless access points that the user device 1 can currently scan, or from otherwise determined wireless access points matching the user device 1, for example, the wireless access points that match the user device 1 corresponding to a cloud server. Here, the wireless access point is an access point corresponding to the wireless network, wherein the wireless network includes, but is not limited to, a wireless local area network based on IEEE 802.11 series standard protocols, for example, a wireless local area network based on the IEEE 802.11b protocol, that is, a so-called WiFi network. The user device 1 can access the corresponding wireless network through the wireless access point. Here, the target wireless access point will require the user device 1 to further perform corresponding connection authentication after the user device 1 issues a connection request, and only the user device 1 that passes the connection authentication can successfully use the corresponding wireless network based on the target wireless access point. Here, the user device 1 will receive the connection authentication request sent by a device corresponding to the wireless access point during a connection with the target wireless access point. For example, the user device 1 may receive an authentication page sent by an AP (Wireless Access Point) device corresponding to the wireless access point, such as an authentication webpage, or an authentication application interface; or other authentication relevant information, such as protocol authentication information corresponding to the authentication protocol, etc.

Then, the second means 12 executes, according to access point type information corresponding to the target wireless access point, an authentication module corresponding to the access point type information to complete the connection authentication of the target wireless access point. Here, the access point type information comprises any one of: an operator authentication access point; a cooperation authentication access point; and a short message authentication access point. The operator authentication access point includes, but is not limited to, an access point customized by an existing or a future network service provider, such as authentication access points provided by the operators such as China Unicom, China Telecom, and China Mobile. The cooperation authentication access point includes a wireless access point that cooperates with each of the custom authentication protocols, and the user device 1 has an authentication module related to the custom authentication protocol, so that the connection authentication can be implemented between the device corresponding to the target wireless access point and the user device 1 by means of the custom authentication protocol. The short message authentication access point includes a wireless access point of which the connection authentication is implemented by means of short message authentication information, which is acquired by a communication device, and in combination with the corresponding authentication page. Here, different types of wireless access points may correspond to different authentication modules, and the same type of wireless access points may each have a different authentication module, for example, the authentication modules of wireless access points of different operators are different, and for another example, specific authentication modules of cooperation authentication access points corresponding to different custom protocols are also different. Here, the various types of authentication modules may include executable program codes corresponding to the connection authentication operation, e.g., a page script file, etc. Here, the authentication module may be preferentially loaded or run in the user device 1, for example, a wireless network connection application is run in the user device 1, and the user device 1 acquires, and even updates, each of the corresponding authentication modules in real time based on an application update push of the application. Here, the execution of each of the authentication modules does not require a manual operation by the user, but automatically implements a corresponding connection authentication operation based on the settings of the code.

Compared with the prior art, for the acquired connection authentication request corresponding to the target wireless access point, the user device 1 in the present application will correspondingly execute, on the basis of different types of access point type information, a specific authentication module corresponding to the access point type information, so as to complete the connection authentication of the target wireless access point. Thereby, diversified demands on the connection authentication when the user connects to the wireless access point can be met in practice and the needs of connection authentication of various types of wireless access points can be addressed. Meanwhile, the authentication module can implement automatic connection authentication, thereby reducing the manual operation of the users, and meeting convenient demand on connection authentication when the users connect to the wireless access point.

In an embodiment, the access point type information comprises the operator authentication access point, wherein the second means 12 is used for: when the access point type information comprises the operator authentication access point, determining, according to protocol feature information in the connection authentication request, the authentication module corresponding to the access point type information, wherein the authentication module is adapted to an operator authentication policy corresponding to the target wireless access point; and executing the authentication module to implement the connection authentication of the target wireless access point.

Specifically, here, the operator authentication access point is an access point type that is widely applied at present. In this embodiment, the target wireless access point to which the user device initiates the connection is an operator authentication access point, and here, the user device 1 pre-stores use account information about the operator corresponding to the target wireless access point or can acquire the use account information in time, and based on the user account, the user device 1 can implement connection authentication with the target wireless access point. Further, based on the protocol feature information in the connection authentication request, for example, information about the authentication module corresponding to the target wireless access point, such as an SSID (Service Set Identifier) of the target wireless access point, or other more accurate recognition information, can be identified, and the user device 1 will determine a corresponding authentication module based on the protocol feature information, and further execute the authentication module based on a pre-set operator authentication policy to achieve the purposes of implementing the connection authentication. For example, the authentication policy is to analyse the connection authentication request and to implement the connection authentication by extracting an authentication protocol flow from the connection authentication request and then by mean of a pre-set code, and at this time, if the connection authentication request corresponds to the authentication page, the authentication protocol flow may be extracted by analysing relevant information about the authentication page, and then the authentication flow is completed by the pre-set code.

Here, the connection authentication request comprises an authentication page corresponding to the target wireless access point, wherein the first means 11 is further used for prohibiting display of the authentication page. At this point, the connection authentication request returned by the device corresponding to the target wireless access point is an authentication page, for example, an authentication page corresponding to a browser webpage on the user device 1 or an application interface. In this embodiment, in order to improve the efficiency of connection authentication and optimize connection experience for the user, it is unnecessary to open and present the authentication page in the browser corresponding to the user device 1 or in the corresponding application; but rather, the authentication page information is directly extracted based on the settings of the authentication module, for example, settings of the corresponding code, and the process of the connection authentication is implemented in the background.

In an embodiment, the access point type information comprises the cooperation authentication access point, wherein the first means 11 submits a network access request by using a connection between the user device 1 and the target wireless access point, and receives a connection authentication request corresponding to the network access request, wherein when the target wireless access point is the cooperation authentication access point, the connection authentication request comprising protocol feature information that is provided by the target wireless access point after identifying the user device 1 as a co-operator; and wherein the second means 12 determines, according to the protocol feature information in the connection authentication request, an authentication module corresponding to the access point type information, and executes the authentication module to complete the connection authentication of the target wireless access point.

Specifically, the cooperation authentication access point includes a wireless access point that cooperates with each of the custom authentication protocols, and only the user device 1 has an authentication module related to the custom authentication protocol, so that the connection authentication can be implemented between the device corresponding to the target wireless access point and the user device 1 by means of the custom authentication protocol. Here, the user device 1 submits a network access request by using a connection with the target wireless access point, for example, when the user initiates an access to the browser webpage on the user device 1 or the corresponding application page, after the user device 1 initiates the connection to the target wireless access point, that is, corresponding to submitting the corresponding network access request to the wireless access point. At this time, a receiving device for the network access request, that is, the device corresponding to the target wireless access point will first determine, based on the network access request, whether the user device 1 is a user device to which the connection authentication corresponding to the cooperation authentication access point is applicable, and if the user device 1 is a corresponding co-operator, the receiving device will send the connection authentication request containing the protocol feature information to the user device 1, for example, URL (Uniform Resource Locator) information corresponding to the network access request contains identification information corresponding to a wireless connection application loaded in the user device 1, while the wireless connection application has a corresponding cooperative relationship with the target wireless access point; and at this time, after receiving the network access request, the device corresponding to the target wireless access point can then determine that the user device 1 is the co-operator for the target wireless access point from the above URL information, and send the corresponding connection authentication request to the user device 1, and then, the user device 1 will accurately match the authentication module corresponding to the access point type information about the target wireless access point based on the received protocol feature information. The protocol feature information herein may include authentication relevant information corresponding to the custom authentication protocol, for example, a specific protocol character string, etc., and based on the protocol character string, the corresponding protocol authentication will be initiated.

In this embodiment, when the access point type information indicates the cooperation authentication access point, the user device 1 determines an authentication module corresponding to the matched access point type information based on the protocol feature information contained in the received connection authentication request, and then can complete the connection authentication of the target wireless access point by executing the authentication module. Here, with the present application, the user device 1 can be smoothly compatible with the connection authentication approaches under various custom protocols, and provides a platform that can be used by specific users for various types of wireless access points based on custom authentication approaches, thereby enriching the wireless access points that users can authenticate and use. Moreover, the connection authentication process implemented based on the cooperation authentication access point in the present application is convenient and has a high degree of automation, which brings good networking experience to the users.

In an embodiment, the access point type information comprises the short message authentication access point, wherein the first means 11 is further used for receiving an authentication page corresponding to the connection authentication request; and then the second means 12 executes an authentication module corresponding to the access point type information on the authentication page to complete the connection authentication of the target wireless access point.

Specifically, here, the short message authentication access point includes a wireless access point of which the connection authentication is implemented using short message authentication information, which is acquired by a communication device, and in combination with the corresponding authentication page. In this embodiment, the connection authentication request acquired by the first means 11 comprises the authentication page, and thus an authentication module corresponding to the access point type information is executed on the authentication page to complete the connection authentication of the target wireless access point. Here, the acquired authentication page can be configured to be presented on the user device 1 as needed, for example, the authentication page is displayed in a browser corresponding to the user device 1, or the authentication page is displayed on an application interface corresponding to the user device, and then the connection authentication is implemented by executing the authentication module; alternatively, after acquiring the authentication page, the authentication module corresponding to the access point type information can be directly executed in the background of the user device 1 based on information about the authentication page to complete the connection authentication of the target wireless access point.

Figure 2:
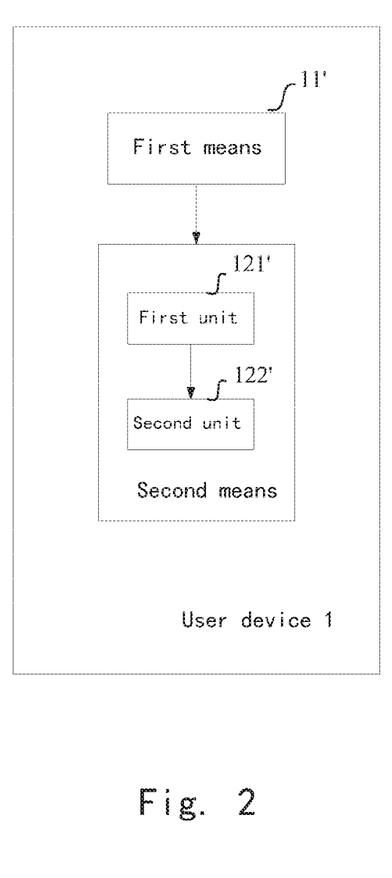
FIG. 2 shows a schematic device diagram of a user device for implementing connection authentication of a wireless access point according to one preferred embodiment of the present application.

On this basis, FIG. 2 shows a schematic device diagram of a user device 1 for implementing connection authentication of a wireless access point according to an embodiment of the present application. The user device 1 includes first means 11' and second means 12'; furthermore, the second means 12' includes a first unit 121' and a second unit 122'. Specifically, the first means 11' executes, according to access point type information corresponding to the target wireless access point, an authentication module corresponding to the access point type information to complete the connection authentication of the target wireless access point, and displays an authentication page corresponding to the connection authentication request; the first unit 121' of the second device 12' updates the authentication page, wherein the updated authentication page contains the authentication module corresponding to the access point type information; and the second unit 122' of the second device 12' completes the connection authentication of the target wireless access point by executing the authentication module.

Specifically, the user device 1 will automatically update an authentication page corresponding to the connection authentication request based on the authentication page, so that the authentication module corresponding to the access type information about the target wireless access point is loaded into the updated authentication page. For example, a pre-set script file corresponding to the access type information about the target wireless access point is loaded into the authentication page via the update operation. In this embodiment, after the user device receives the authentication page, such as authentication webpage source code, and before the user device 1 displays the authentication page, the pre-set script file can be injected into the authentication source code, and then the connection authentication of the target wireless access point is implemented by executing the updated authentication webpage source code.

Here, further the second unit 122' includes a first subunit (not shown) and a second subunit (not shown), wherein the first subunit sends a verification information acquisition request corresponding to the connection authentication request and receives corresponding verification information by executing the authentication module; and the second subunit executes the connection authentication of the target wireless access point according to the verification information.

Specifically, when the access point type information comprises a short message authentication access point, an automatic connection authentication can be implemented based on the corresponding authentication module and in combination with the parsing of information contents in the authentication page. Here, firstly, the first subunit sends a verification information acquisition request corresponding to the connection authentication request and receives corresponding verification information by executing the authentication module, for example, based on the authentication module and according to a determined big-data analysis result, the user device 1 will intelligently lock a verification account input region in the authentication page, and intelligently input a corresponding verification account and submits the corresponding verification information acquisition request, and after acquiring the verification information corresponding to the verification information acquisition request, the user device will then intelligently execute the connection authentication of the target wireless access point based on the authentication module, for example, intelligently reading the verification information, and then completing the verification operation of the verification information.

Here, the verification information acquisition request comprises a verification account corresponding to the user device 1. Here, the verification account corresponding to the user device 1 may be a universal verification account acquired from a third party device, such as a cloud device, or may also be an available verification account provided from application information about the user device 1 per se. Here, the verification information acquisition request comprises the verification account, so that a device corresponding to the verification account can be used to receive the verification information corresponding to the verification information acquisition request.

Here, the first subunit sends the verification information acquisition request corresponding to the connection authentication request by executing the authentication module, wherein the verification information acquisition request comprises a mobile phone communication number corresponding to the user device 1; and extracts the corresponding verification information from short message information corresponding to the verification information acquisition request received by the user device 1. Specifically, the user device 1 here is correspondingly a mobile phone device, and the verification information acquisition request includes the mobile phone communication number corresponding to the user device 1, and the mobile phone communication number may be acquired through grabbing by the user device 1 from the application information corresponding to the device. Here, the mobile phone communication number is the local number of the user device 1. Next, the verification information corresponding to the verification information acquisition request will be received by the user device 1 in the form of mobile phone short message information. Further, by executing the authentication module, an automatic reading function for the short message information is performed, for example, the corresponding verification information is extracted by means of text parsing. Further, intelligent connection authentication of the target wireless access point is implemented based on performing subsequent automatic operations, such as intelligent input of the verification information corresponding to the module.

In this embodiment, when the access point type information indicates the short message authentication access point, the user device 1 will execute an authentication module corresponding to the access point type information on the displayed authentication page to complete the connection authentication of the target wireless access point. In particular, in an embodiment, a series of operations, such as automatic sending of the verification information acquisition request corresponding to the connection authentication request, and automatic extraction and input of the corresponding verification information are implemented by executing the authentication module to complete the connection authentication of the target wireless access point. Thereby, replacing a user manual connection authentication operation by an automatic authentication operation of the authentication module improves the efficiency of the connection authentication of the wireless access point and optimizes the user experience.

Figure 3:
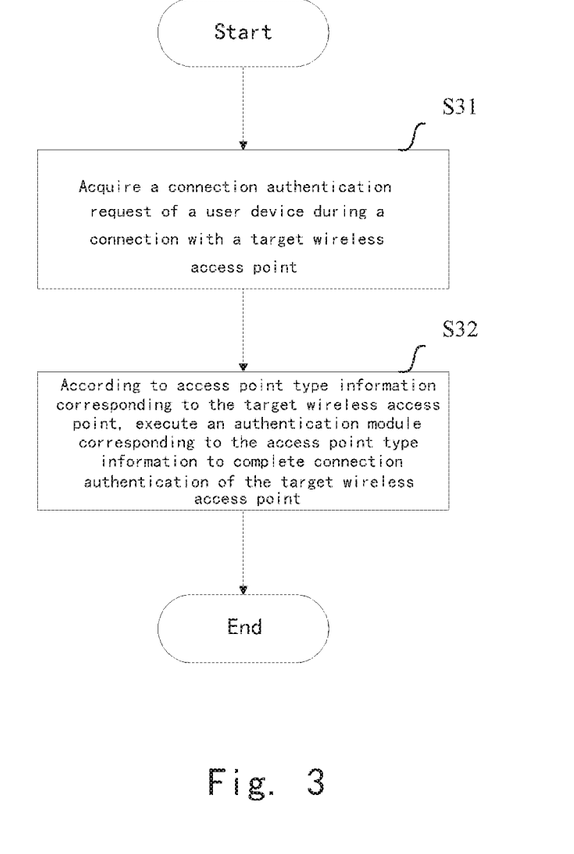
FIG. 3 shows a flowchart of a method for implementing connection authentication of a wireless access point according to another aspect of the present application.

FIG. 3 shows a flowchart of a method for implementing connection authentication of a wireless access point according to another aspect of the present application. The method includes step S31 and step S32. In step S31, the user device 1 acquires a connection authentication request of a user device 1 during a connection with a target wireless access point; and in step S32, the user device 1 executes, according to access point type information corresponding to the target wireless access point, an authentication module corresponding to the access point type information to complete the connection authentication of the target wireless access point. Here, the user device 1 includes various smart terminals, such as a mobile smart device, various personal computers, and so forth.

Specifically, in step S31, the user device 1 acquires a connection authentication request of a user device 1 during a connection with a target wireless access point. Here, the user device 1 may determine the target wireless access point requested to connect, based on the selection of the user, or the user device 1 automatically determines the target wireless connection point for the corresponding user based on pre-set connection conditions. Here, in order to improve success rate of wireless connection, the target wireless access point may be from wireless access points that the user device 1 can currently scan, or from otherwise determined wireless access points matching the user device 1, for example, the wireless access points that match the user device 1 corresponding to a cloud server. Here, the wireless access point is an access point corresponding to the wireless network, wherein the wireless network includes, but is not limited to, a wireless local area network based on IEEE 802.11 series standard protocols, for example, a wireless local area network based on the IEEE 802.11b protocol, that is, a so-called WiFi network. The user device 1 can access the corresponding wireless network through the wireless access point. Here, the target wireless access point will require the user device 1 to further perform corresponding connection authentication after the user device 1 issues a connection request, and only the user device 1 that passes the connection authentication can successfully use the corresponding wireless network based on the target wireless access point. Here, the user device 1 will receive the connection authentication request sent by a device corresponding to the wireless access point during a connection with the target wireless access point. For example, the user device 1 may receive an authentication page sent by an AP (Wireless Access Point) device corresponding to the wireless access point, such as an authentication webpage, or an authentication application interface; or other authentication relevant information, such as protocol authentication information corresponding to the authentication protocol, etc.

Then, in step S32, the user device 1 executes, according to access point type information corresponding to the target wireless access point, an authentication module corresponding to the access point type information to complete the connection authentication of the target wireless access point. Here, the access point type information comprises any one of: an operator authentication access point; a cooperation authentication access point; and a short message authentication access point. The operator authentication access point includes, but is not limited to, an access point customized by an existing or a future network service provider, such as authentication access points provided by the operators such as China Unicom, China Telecom, and China Mobile. The cooperation authentication access point includes a wireless access point that cooperates with each of the custom authentication protocols, and the user device 1 has an authentication module related to the custom authentication protocol, so that the connection authentication can be implemented between the device corresponding to the target wireless access point and the user device 1 by means of the custom authentication protocol. The short message authentication access point includes a wireless access point of which the connection authentication is implemented by means of short message authentication information, which is acquired by a communication device, and in combination with the corresponding authentication page. Here, different types of wireless access points may correspond to different authentication modules, and the same type of wireless access points may each have a different authentication module, for example, the authentication modules of wireless access points of different operators are different, and for another example, specific authentication modules of cooperation authentication access points corresponding to different custom protocols are also different. Here, the various types of authentication modules may include executable program codes corresponding to the connection authentication operation, e.g., a page script file, etc. Here, the authentication module may be preferentially loaded or run in the user device 1, for example, a wireless network connection application is run in the user device 1, and the user device 1 acquires, and even updates, each of the corresponding authentication modules in real time based on an application update push of the application. Here, the execution of each of the authentication modules does not require a manual operation by the user, but automatically implements a corresponding connection authentication operation based on the settings of the code.

Compared with the prior art, for the acquired connection authentication request corresponding to the target wireless access point, the user device 1 in the present application will correspondingly execute, on the basis of different types of access point type information, a specific authentication module corresponding to the access point type information, so as to complete the connection authentication of the target wireless access point. Thereby, diversified demands on the connection authentication when the user connects to the wireless access point can be met in practice and the needs of connection authentication of various types of wireless access points can be addressed. Meanwhile, the authentication module can implement automatic connection authentication, thereby reducing the manual operation of the users, and meeting convenient demand on connection authentication when the users connect to the wireless access point.

In an embodiment, the access point type information comprises the operator authentication access point, wherein in step S32, the user device 1 is used for: when the access point type information comprises the operator authentication access point, determining, according to protocol feature information in the connection authentication request, the authentication module corresponding to the access point type information, wherein the authentication module is adapted to an operator authentication policy corresponding to the target wireless access point; and executing the authentication module to implement the connection authentication of the target wireless access point.

Specifically, here, the operator authentication access point is an access point type that is widely applied at present. In this embodiment, the target wireless access point to which the user device initiates the connection is an operator authentication access point, and here, the user device 1 pre-stores use account information about the operator corresponding to the target wireless access point or can acquire the use account information in time, and based on the user account, the user device 1 can implement connection authentication with the target wireless access point. Further, based on the protocol feature information in the connection authentication request, for example, information about the authentication module corresponding to the target wireless access point, such as an SSID (Service Set Identifier) of the target wireless access point, or other more accurate recognition information, can be identified, and the user device 1 will determine a corresponding authentication module based on the protocol feature information, and further execute the authentication module based on a pre-set operator authentication policy to achieve the purposes of implementing the connection authentication. For example, the authentication policy is to analyse the connection authentication request and to implement the connection authentication by extracting an authentication protocol flow from the connection authentication request and then by mean of a pre-set code, and at this time, if the connection authentication request corresponds to the authentication page, the authentication protocol flow may be extracted by analysing relevant information about the authentication page, and then the authentication flow is completed by the pre-set code.

Here, the connection authentication request comprises an authentication page corresponding to the target wireless access point, wherein the user device 1 is further used for prohibiting display of the authentication page in step S31. At this point, the connection authentication request returned by the device corresponding to the target wireless access point is an authentication page, for example, an authentication page corresponding to a browser webpage on the user device 1 or an application interface. In this embodiment, in order to improve the efficiency of connection authentication and optimize connection experience for the user, it is unnecessary to open and present the authentication page in the browser corresponding to the user device 1 or in the corresponding application; but rather, the authentication page information is directly extracted based on the settings of the authentication module, for example, settings of the corresponding code, and the process of the connection authentication is implemented in the background.

In an embodiment, the access point type information comprises the cooperation authentication access point, wherein in step S31, the user device 1 submits a network access request by using a connection between the user device 1 and the target wireless access point, and receives a connection authentication request corresponding to the network access request, wherein when the target wireless access point is the cooperation authentication access point, the connection authentication request comprises protocol feature information that is provided by the target wireless access point after identifying the user device 1 as a co-operator; and wherein in step S32, the user device 1 determines, according to the protocol feature information in the connection authentication request, an authentication module corresponding to the access point type information, and executes the authentication module to complete the connection authentication of the target wireless access point.

Specifically, the cooperation authentication access point includes a wireless access point that cooperates with each of the custom authentication protocols, and only the user device 1 has an authentication module related to the custom authentication protocol, so that the connection authentication can be implemented between the device corresponding to the target wireless access point and the user device 1 by means of the custom authentication protocol. Here, the user device 1 submits a network access request by using a connection with the target wireless access point, for example, when the user initiates an access to the browser webpage on the user device 1 or the corresponding application page, after the user device 1 initiates the connection to the target wireless access point, that is, corresponding to submitting the corresponding network access request to the wireless access point. At this time, a receiving device for the network access request, that is, the device corresponding to the target wireless access point will first determine, based on the network access request, whether the user device 1 is a user device to which the connection authentication corresponding to the cooperation authentication access point is applicable, and if the user device 1 is a corresponding co-operator, the receiving device will send the connection authentication request containing the protocol feature information to the user device 1, for example, URL (Uniform Resource Locator) information corresponding to the network access request contains identification information corresponding to a wireless connection application loaded in the user device 1, while the wireless connection application has a corresponding cooperative relationship with the target wireless access point; and at this time, after receiving the network access request, the device corresponding to the target wireless access point can then determine that the user device 1 is the co-operator for the target wireless access point from the above URL information, and send the corresponding connection authentication request to the user device 1, and then, the user device 1 will accurately match the authentication module corresponding to the access point type information about the target wireless access point based on the received protocol feature information. The protocol feature information herein may include authentication relevant information corresponding to the custom authentication protocol, for example, a specific protocol character string, etc., and based on the protocol character string, the corresponding protocol authentication will be initiated.

In this embodiment, when the access point type information indicates the cooperation authentication access point, the user device 1 determines an authentication module corresponding to the matched access point type information based on the protocol feature information contained in the received connection authentication request, and then can complete the connection authentication of the target wireless access point by executing the authentication module. Here, with the present application, the user device 1 can be smoothly compatible with the connection authentication approaches under various custom protocols, and provides a platform that can be used by specific users for various types of wireless access points based on custom authentication approaches, thereby enriching the wireless access points that users can authenticate and use. Moreover, the connection authentication process implemented based on the cooperation authentication access point in the present application is convenient and has a high degree of automation, which brings good networking experience to the users.

In an embodiment, the access point type information comprises the short message authentication access point, wherein in step S31, the user device 1 is further used for receiving an authentication page corresponding to the connection authentication request; and then, in step S32, the user device 1 executes an authentication module corresponding to the access point type information on the authentication page to complete the connection authentication of the target wireless access point.

Specifically, here, the short message authentication access point includes a wireless access point of which the connection authentication is implemented using short message authentication information, which is acquired by a communication device, and in combination with the corresponding authentication page. In this embodiment, in step S31, the connection authentication request acquired by the user device 1 comprises the authentication page, and thus an authentication module corresponding to the access point type information is executed on the authentication page to complete the connection authentication of the target wireless access point. Here, the acquired authentication page can be configured to be presented on the user device 1 as needed, for example, the authentication page is displayed in a browser corresponding to the user device 1, or the authentication page is displayed on an application interface corresponding to the user device, and then the connection authentication is implemented by executing the authentication module; alternatively, after acquiring the authentication page, the authentication module corresponding to the access point type information can be directly executed in the background of the user device 1 based on information about the authentication page to complete the connection authentication of the target wireless access point.

Figure 4:
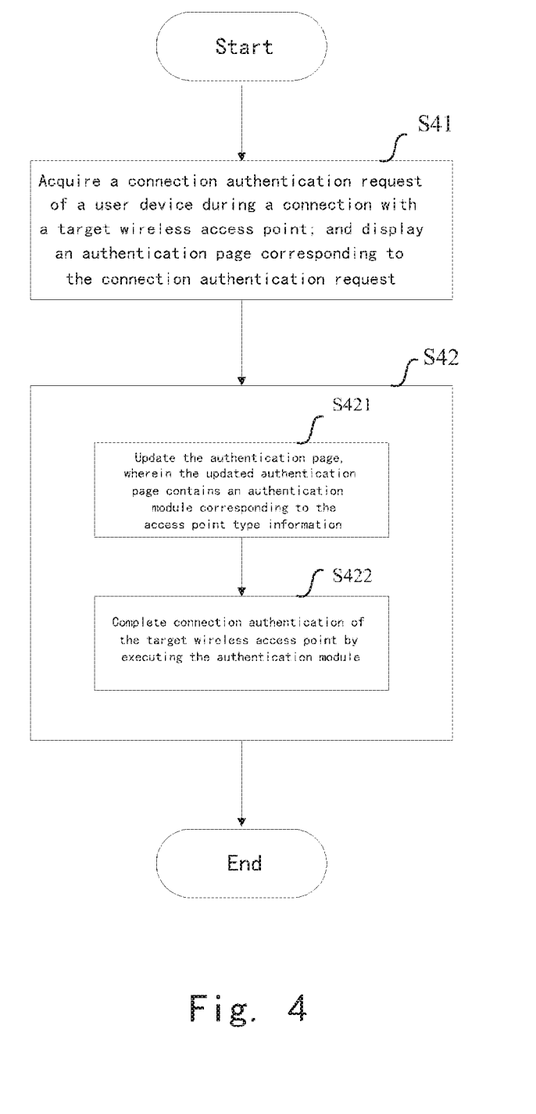
FIG. 4 shows a flowchart of a method for implementing connection authentication of a wireless access point according to one preferred embodiment of the present application.

On this basis, FIG. 4 shows a flowchart of a method for implementing connection authentication of a wireless access point according to a preferred embodiment of the present application. The method includes step S41 and step S42; furthermore, the step S42 includes step S421 and step S422. Specifically, in step S41, the user device 1 executes, according to access point type information corresponding to the target wireless access point, an authentication module corresponding to the access point type information to complete the connection authentication of the target wireless access point, and displays an authentication page corresponding to the connection authentication request; in step S421, the user device 1 updates the authentication page, wherein the updated authentication page contains the authentication module corresponding to the access point type information; and in step S422, the user device 1 completes the connection authentication of the target wireless access point by executing the authentication module.

Specifically, the user device 1 will automatically update an authentication page corresponding to the connection authentication request based on the authentication page, so that the authentication module corresponding to the access type information about the target wireless access point is loaded into the updated authentication page. For example, a pre-set script file corresponding to the access type information about the target wireless access point is loaded into the authentication page via the update operation. In this embodiment, after the user device receives the authentication page, such as authentication webpage source code, and before the user device 1 displays the authentication page, the pre-set script file can be injected into the authentication source code, and then the connection authentication of the target wireless access point is implemented by executing the updated authentication webpage source code.

Here, further the step S422 includes step S4221 (not shown) and step S4222 (not shown). In step S4221, the user device 1 sends a verification information acquisition request corresponding to the connection authentication request and receives corresponding verification information by executing the authentication module; and in step S4222, the user device 1 executes the connection authentication of the target wireless access point according to the verification information.

Specifically, when the access point type information comprises a short message authentication access point, an automatic connection authentication can be implemented based on the corresponding authentication module and in combination with the parsing of information contents in the authentication page. Here, firstly, in step S4221, the user device 1 sends a verification information acquisition request corresponding to the connection authentication request and receives corresponding verification information by executing the authentication module, for example, based on the authentication module and according to a determined big-data analysis result, the user device 1 will intelligently lock a verification account input region in the authentication page, and intelligently input a corresponding verification account and submits the corresponding verification information acquisition request, and after acquiring the verification information corresponding to the verification information acquisition request, the user device will then intelligently execute the connection authentication of the target wireless access point based on the authentication module, for example, intelligently reading the verification information, and then completing the verification operation of the verification information.

Here, the verification information acquisition request comprises a verification account corresponding to the user device 1. Here, the verification account corresponding to the user device 1 may be a universal verification account acquired from a third party device, such as a cloud device, or may also be an available verification account provided from application information about the user device 1 per se. Here, the verification information acquisition request comprises the verification account, so that a device corresponding to the verification account can be used to receive the verification information corresponding to the verification information acquisition request.

Here, in step S4221, the user device 1 sends the verification information acquisition request corresponding to the connection authentication request by executing the authentication module, wherein the verification information acquisition request comprises a mobile phone communication number corresponding to the user device 1; and extracts the corresponding verification information from short message information corresponding to the verification information acquisition request received by the user device 1. Specifically, the user device 1 here is correspondingly a mobile phone device, and the verification information acquisition request includes the mobile phone communication number corresponding to the user device 1, and the mobile phone communication number may be acquired through grabbing by the user device 1 from the application information corresponding to the device. Here, the mobile phone communication number is the local number of the user device 1. Next, the verification information corresponding to the verification information acquisition request will be received by the user device 1 in the form of mobile phone short message information. Further, by executing the authentication module, an automatic reading function for the short message information is performed, for example, the corresponding verification information is extracted by means of text parsing. Further, intelligent connection authentication of the target wireless access point is implemented based on performing subsequent automatic operations, such as intelligent input of the verification information corresponding to the module.

In this embodiment, when the access point type information indicates the short message authentication access point, the user device 1 will execute an authentication module corresponding to the access point type information on the displayed authentication page to complete the connection authentication of the target wireless access point. In particular, in an embodiment, a series of operations, such as automatic sending of the verification information acquisition request corresponding to the connection authentication request, and automatic extraction and input of the corresponding verification information are implemented by executing the authentication module to complete the connection authentication of the target wireless access point. Thereby, replacing a user manual connection authentication operation by an automatic authentication operation of the authentication module improves the efficiency of the connection authentication of the wireless access point and optimizes the user experience.

It is apparent that the present application is not limited to the details of the above-mentioned exemplary embodiments, and the present application can be implemented in other specific forms without departing the spirit or basic features of the present application. Therefore, no matter from which point of view, the embodiments should all be regarded as exemplary and non-limiting. The scope of the present application is defined by the appended claims rather than the above-mentioned description, and therefore it is intended that all changes which fall within the meaning and range of equivalency of the claims are embraced in the present application. Any reference signs in the claims should not be construed as limiting the claims involved. In addition, it is apparent that the word "comprising" does not exclude other elements or steps, and the singular does not exclude the plural. A plurality of units or means stated in the device claims may also be implemented by one unit or means by means of software or hardware. The terms first and second and the like are used to represent names and do not represent any particular order.

What is claimed is:

1. A method for implementing connection authentication of a wireless access point at a user device, the method comprising:

acquiring a connection authentication request of the user device during a connection with a target wireless access point from the target wireless access point, wherein the connection authentication request comprises corresponding protocol feature information or authentication page;

determining an authentication module corresponding to access point type information of the target wireless access point according to the corresponding protocol feature information or authentication page, wherein the access point type information comprises any one of an operator authentication access point, a cooperation authentication access point, and a short message authentication access point, wherein the operator authentication access point includes an access point customized by a network service provider, the cooperation authentication access point includes a wireless access point that cooperates with a custom authentication protocol, the short message authentication access point includes a wireless access point of which the connection authentication is implemented by means of short message authentication information, and executing the authentication module corresponding to the access point type information to complete the connection authentication of the target wireless access point.

2. The method of claim 1, wherein the step of executing the authentication module corresponding to the access point type information to complete the connection authentication of the target wireless access point comprises:

when the access point type information comprises the operator authentication access point, determining, according to the protocol feature information in the connection authentication request, the authentication module corresponding to the access point type information, wherein the authentication module is adapted to an operator authentication policy corresponding to the target wireless access point; and executing the authentication module to complete the connection authentication of the target wireless access point.

3. The method of claim 2, wherein the step of acquiring the connection authentication request of a user device during the connection with a target wireless access point further comprises:
when the connection authentication request comprises the authentication page corresponding to the target wireless access point, prohibiting display of the authentication page.

4. The method of claim 1, wherein the step of acquiring the connection authentication request of the user device during the connection with the target wireless access point comprises:
when the access point type information comprises the cooperation authentication access point, submitting a network access request by using a connection between the user device and the target wireless access point; and
receiving the connection authentication request corresponding to the network access request, wherein when the target wireless access point is the cooperation authentication access point, the connection authentication request comprises protocol feature information that is provided by the target wireless access point after identifying the user device as a cooperator; and
wherein the step of executing the authentication module corresponding to the access point type information to complete the connection authentication of the target wireless access point comprises:
determining, according to the protocol feature information in the connection authentication request, the authentication module corresponding to the access point type information; and
executing the authentication module to complete the connection authentication of the target wireless access point.

5. The method of claim 1, wherein the step of acquiring the connection authentication request of the user device during the connection with the target wireless access point comprises:
when the access point type information comprises the short message authentication access point, receiving the authentication page corresponding to the connection authentication request; and
wherein the step of executing the authentication module corresponding to the access point type information to complete the connection authentication of the target wireless access point comprises:
executing the authentication module corresponding to the access point type information on the authentication page to complete the connection authentication of the target wireless access point.

6. The method of claim 5, wherein the step of executing the authentication module corresponding to the access point type information to complete the connection authentication of the target wireless access point comprises:
updating the authentication page, wherein the updated authentication page includes the authentication module corresponding to the access point type information; and
completing the connection authentication of the target wireless access point by executing the authentication module.

7. The method of claim 6, wherein the step of completing the connection authentication of the target wireless access point by executing the authentication module comprises:
sending a verification information acquisition request corresponding to the connection authentication request by executing the authentication module and receiving corresponding verification information; and
executing the connection authentication of the target wireless access point according to the verification information.

8. The method of claim 7, wherein the verification information acquisition request comprises a verification account corresponding to the user device.

9. The method of claim 7, wherein the step of sending a verification information acquisition request corresponding to the connection authentication request by executing the authentication module and receiving corresponding verification information comprises:
sending the verification information acquisition request corresponding to the connection authentication request by executing the authentication module, wherein the verification information acquisition request comprises a mobile phone communication number corresponding to the user device; and
extracting the corresponding verification information from short message information corresponding to the verification information acquisition request received by the user device.

10. A non-transitory computer-readable medium storing instructions, which when executed by one or more processors, cause an apparatus at least to:
acquire, at a user device, a connection authentication request of the user device during a connection with a target wireless access point, wherein the connection authentication request comprises corresponding protocol feature information or authentication page;
determine, at the user device, an authentication module corresponding to access point type information of the target wireless access point according to the corresponding protocol feature information or authentication page, wherein the access point type information comprises any one of an operator authentication access point, a cooperation authentication access point, and a short message authentication access point, wherein the operator authentication access point includes an access point customized by a network service provider, the cooperation authentication access point includes a wireless access point that cooperates with a custom authentication protocol, the short message authentication access point includes a wireless access point of which the connection authentication is implemented by means of short message authentication information, and
execute, at the user device, the authentication module corresponding to the access point type information to complete the connection authentication of the target wireless access point.

11. An apparatus, comprising:
a memory; and
one or more processors executing instructions stored in the memory to cause the apparatus to:
acquire, at a user device, a connection authentication request of the user device during a connection with a target wireless access point, wherein the connection authentication request comprises corresponding protocol feature information or authentication page;
determine, at the user device, an authentication module corresponding to access point type information of the target wireless access point according to the corresponding protocol feature information or authentication page, wherein the access point type information comprises any one of an operator authentication access point, a cooperation authentication access point, and a short message authentication access point, wherein the operator authentication access point includes an access point customized by a network service provider, the cooperation authentication access point includes a wireless access point that cooperates with a custom authentication protocol, the short message authentication access point includes a wireless access point of which the connection authentication is implemented by means of short message authentication information, and execute the authentication module corresponding to the access point type information to complete the connection authentication of the target wireless access point.

* * * * *